E. Harrison.
Flour Mill.
No. 625. Reissued Nov. 16, 1858.
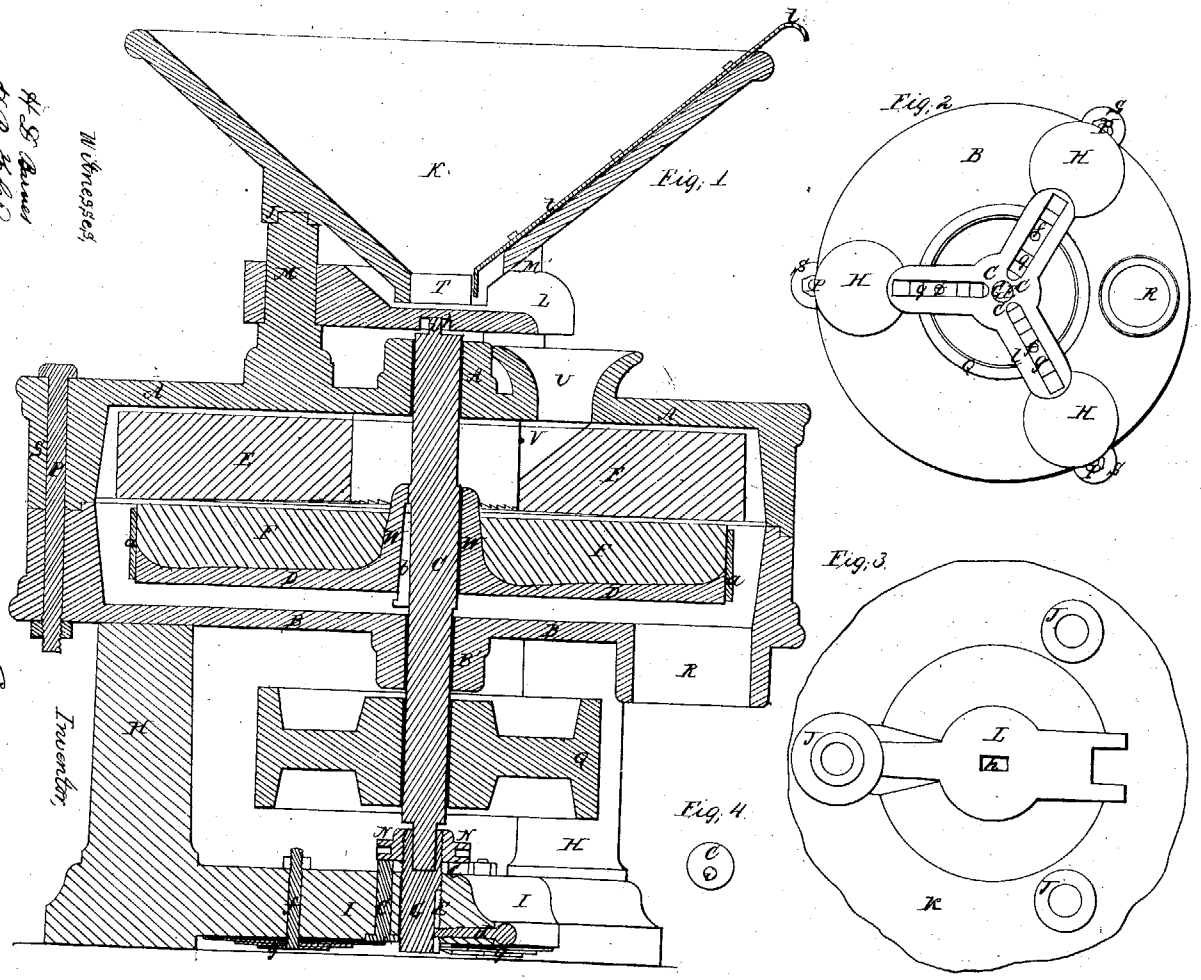
Witnesses,
H. S. Barnes
H. B. Tyler
Inventor,
Edward Harris

UNITED STATES PATENT OFFICE.

EDWARD HARRISON, OF NEW HAVEN, CONNECTICUT.

IMPROVEMENT IN GRINDING MILLS.

Specification forming part of Letters Patent No. 11,040, dated June 6, 1854; Reissue No. 625, dated November 16, 1858.

*To all whom it may concern:*

Be it known that I, EDWARD HARRISON, of the city and county of New Haven, in the State of Connecticut, have invented certain new and useful Improvements in Mills for Grinding Grain; and I do hereby declare that the following specification, taken in connection with the drawings, is a full, clear, and exact description thereof.

Figure 1 is a vertical section through the center of one of my improved grinding-mills. Fig. 2 is a bottom view of the mill. Fig. 3 is a bottom view of the shoe and a portion of the hopper detached, and Fig. 4 is a view of the top of the shaft.

The same letters indicate like parts in all the figures.

E E, Fig. 1, represent the upper or stationary stone, and F F the lower or runner stone. The upper stone, E E, is cemented or firmly secured by bolts within the upper casing, A, and the runner F F is by the means hereinafter more particularly described secured to the metallic hub and back W D, which is keyed or otherwise made fast to the spindle C.

Motion having been communicated to the spindle, the runner-stone is rotated in a plane parallel with the face of the stationary stone, and freely within the casing B, which incloses it. The grain is supplied to the mill in the ordinary way by means of a shoe fed from a hopper, and, passing through the eye of the stationary stone, falls upon the runner-stone, when, from the high speed at which this discription of mill is capable of being run, it seeks a point as far as possible from the center of the runner, and is thus distributed between the grinding-surfaces of the two stones and converted into flour or meal.

Aside from the features which, in point of construction, distinguish my mill from and render it more compact, efficient, and economical than any other heretofore known, my improvement particularly relates to the method by which the runner-stone is secured to the spindle so as to render the stone capable of receiving the highest safe velocity without the danger of its wearing loose on the spindle, thereby increasing greatly the productive capacity of the mill, while at the same time the method of attachment employed admits of the runner-stone being used until it has become worn so thin as to be worthless, when it can be readily removed and a fresh stone easily substituted.

The principal difficulty which has been experienced heretofore in that class of mills where the runner-stone was attached to a shaft or spindle and revolved by means of it has been to permanently secure the stone from wearing loose. In all cases where the shaft passed through the runner by any of the modes of attachment formerly in use the resistance due to the grinding of the grain was necessarily encountered by the devices which connected the runner with the spindle. Where this device consisted of a metallic hub and a back extending not to the outer edge of the runner, with the stone secured to this back by means of bolts, the strain soon effected the disarrangement of the stone. Experience has shown that the loose attachment, by means of the bail and driver which have been in most general use, was attended with a like result from the same cause, while an attempt to secure a runner-stone to the spindle by keying it on as a grindstone is keyed to its shaft, has proved entirely ineffectual in mills of any size, and in any case where this means is employed the mill having it must soon become from use a most inefficient and inferior machine. To obviate this difficulty as far as possible, by distributing the resistance arising from the use to which the mill is put, and causing it to be expended upon the metallic back and hub rather than upon any particular point or points of connection between the runner and back or runner and spindle, is the object of my invention. To accomplish this I have, as shown in the drawings, extended the metallic back to the outer edge of the stone, and closely united the peripheries of both by means of a metallic ring, *a a*, which ring performs not only the function of the ordinary band in enabling the stone to resist the effect of centrifugal force, but also forms with the back a metallic cup, within which the runner is placed, and by means of which it is kept in position.

The great advantage which is the result of this method of construction is apparent when it is observed that there is no difficulty in keying the metallic hub to the spindle while the runner is held in its place by the grasp of the external ring upon the stone and the back, exerted throughout the whole peripheries of both, which grasp for retaining the stone in place is at points more remote from the center of the spindle than the farthest point of resistance arising from the use of the mill in grinding grain. So long, therefore, as the friction of the metallic band upon the stone and metallic back, aided by its advantage of location just named, is superior to the friction caused by grinding the grain, the runner-stone will remain immovable.

A necessary advantage which results from the mode of attachment described is the facility with which the faces of the two stones can be made true by grinding them together, the glazed points, which are the result of this operation, indicating where the pick is required. Besides, too, the runner stone by this method can be adjusted and made to revolve so accurately with reference to the stationary stone that the faces of the two, when the former is at its speed, shall be so near together as to produce the finest flour or meal. Yet when the feed is shut off the stones will not, as is the case in all other varieties of mills after a short use, come in contact and be dulled.

I am aware that in the construction of mill-stones intended to be operated by a bail and driver a metallic back and flange has been made in one piece, the flange or rim in such case serving the purpose of the ordinary hoop, and instead of a rim of iron cast with the back a wrought-iron rim has been used to bind together a back made in sections; and I am also aware that a metallic hub and a back-plate of less diameter than the runner have been used in mill-stones intended to be driven by a spindle. Therefore I do not claim any of these separately; but What I do claim as my invention, and desire to secure by Letters Patent, is—

The improved method described of securing the runner-stone on the driving spindle in a grinding-mill by means of a metallic band or its equivalent, embracing the periphery of the stone, by combining said band with a hub and a back-plate of at least as great diameter as the runner, and rigidly attached to the spindle, such combination operating to secure the stone firmly in its place, in the manner and on the principle substantially as specified.

EDWARD HARRISON.

Witnesses:
A. B. JACOCKS,
I. G. JACOCKS.